Feb. 13, 1934.   E. R. EVANS   1,946,526
BRAKE
Original Filed March 18, 1931
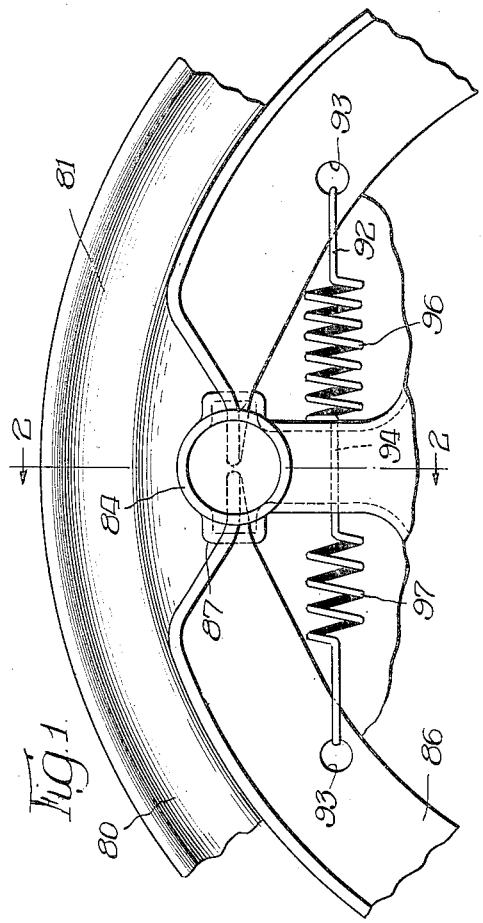
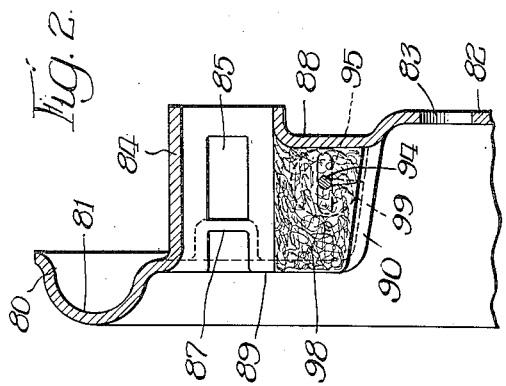
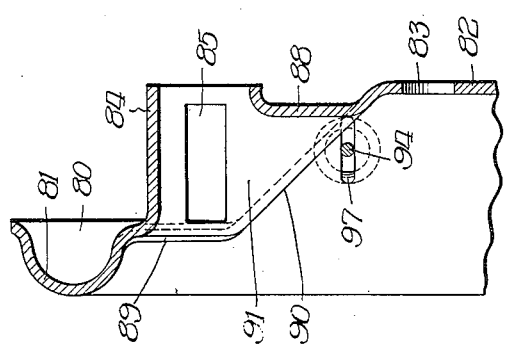
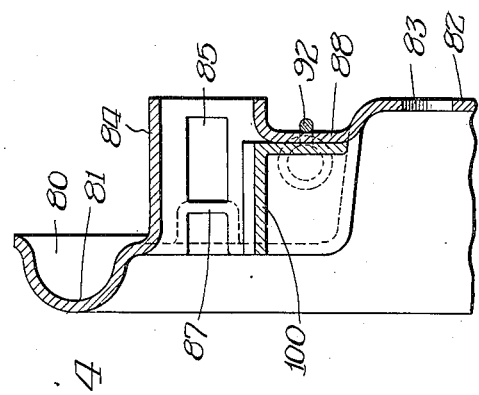
Inventor
Edwin R. Evans,
By Wilkinson Huxley Byron & Knight
attys.

Patented Feb. 13, 1934

1,946,526

UNITED STATES PATENT OFFICE 1,946,526

BRAKE

Edwin R. Evans, Chicago, Ill.

Original application March 18, 1931, Serial No. 523,408, now Patent No. 1,908,013. Divided and this application March 6, 1933. Serial No. 659,652

6 Claims. (Cl. 188—206)

This invention relates to improvements in brake constructions and particularly to the construction of the backing plate which supports the adjustable anchor pin for the brake shoes.

This application is a division of my application, Serial No. 523,408, filed March 18, 1931, now Patent No. 1,908,013, issued May 9, 1933 and covers a modification disclosed but not claimed in my prior application.

It is an object of the present invention to provide a construction in which the backing plate has an integrally formed support for the anchor pin.

It is further an object of the present invention to disclose an improved backing plate in which an integral bearing support for the anchor pin is braced radially by a U-shaped portion of the backing plate.

Additional features and advantages of the construction will be more fully described in connection with the following description taken in connection with the attached drawing.

In the drawing:

Figure 1 is a fragmentary elevation showing the association of a pair of brake shoes with my improved backing plate;

Figure 2 is a detail section taken on the plane indicated 2—2 in Figure 1;

Figure 3 is a detail section similar to Figure 2 but showing a modification, and Figure 4 is a detail section similar to Figures 2 and 3 but showing a further modification.

The anchor plate or backing plate 80 is a pressed metal member having a peripheral depression 81 adapted to overlap the edge of an associated brake drum (not shown). The backing plate has an inwardly pressed central portion 82 provided with bolt-receiving openings 83 for securing the backing plate to a support, such as the steering knuckle. Intermediate the peripheral portion 81 and the central portion 82 the backing plate has an integrally formed bearing or housing 84 which forms a support for an adjustable anchor pin as shown in the above mentioned patent. The housing 84 has lateral slotted openings 85 to receive the adjacent ends of a pair of brake shoes 86. The backing plate also includes a pair of lateral pressed-out portions 87 forming side walls of the slotted portion 85. The inner end portion of the housing 84 is joined to the central portion 82 of the backing plate by a wall 88 while the outer end portion is similarly joined thereto by a vertical wall 89 and an inclined wall 90. Thus, there will be a recess on the outer side of the backing plate between the side walls 91 immediately beneath the anchor pin. This portion forms a radial brace for the housing which is U-shaped in circumferential section.

In Figure 1 a spring 92 is shown extending between openings 93 formed in the brake shoes. The central portion 94 of the spring is received in slots 95 of the side walls 91. In order to close the opening on the outside of the anchor pin immediately therebeneath and prevent dirt from getting into the interior of the brake, I show in Figure 2 a felt piece 98 which has a slit 99 to receive the straight portion 94 of the spring and the felt piece is thereby held in place by the spring. It will be understood that the felt piece is adapted to receive lubricant for lubricating the slidable anchor pin.

In Figure 3 the construction is similar to that of Figure 2 except that this form does not include the lateral pressed-out portions 87. Also, the spring 92 is somewhat lower than in the arrangement shown in Figure 2.

In Figure 4 the construction is quite similar to Figure 2 except that the central portion of the spring does not extend through the anchor plate but overlaps the inner wall 88 so that, in this form, a pressed-metal stamping 100 may be inserted in the recess below the pin instead of the felt piece 92. The piece 100 may be suitably welded to the backing plate and form a continuation of the annular housing 84.

I claim:

1. In a brake construction, a pair of brake shoes, an anchor pin between adjacent ends of said brake shoes, a pressed metal backing plate having an integral bearing portion forming a support for said anchor pin substantially across the width of said brake shoes, said bearing portion having slots to receive the ends of said brake shoes into engagement with said anchor pin.

2. In a brake construction, a pair of brake shoes, an anchor pin between adjacent ends of said brake shoes, a pressed metal backing plate having a central portion inwardly pressed with respect to the marginal portion of said backing plate to form a support therefor, said backing plate having an integrally pressed bearing portion for said anchor pin and said backing plate having an integral brace between the central support and said bearing portion U-shaped in circumferential section.

3. In a brake construction, a pair of brake shoes, an anchor pin between adjacent ends of said brake shoes, a pressed metal backing plate having a central portion inwardly pressed with respect to the marginal portion of said backing plate to form a support therefor, said backing plate having an integrally pressed bearing portion for said anchor pin, said backing plate having an integral brace between the central support and said bearing portion U-shaped in circumferential section and a lubricating packing positioned in said brace portion immediately beneath said anchor pin.

4. In a brake construction, a pair of brake shoes, an anchor pin between adjacent ends of said brake shoes, a pressed metal backing plate having a central portion inwardly pressed with respect to the marginal portion of said backing plate to form a support therefor, said backing plate having an integrally pressed bearing portion for said anchor pin, said backing plate having an integral brace between the central support and said bearing portion U-shaped in circumferential section, a lubricating packing positioned in said brace portion immediately beneath said anchor pin and a spring connecting adjacent ends of said brake shoes extending through said brace portion for holding said packing in place.

5. In a brake construction, a brake element, an anchor pin adapted to be engaged by one end of said brake element, a pressed metal backing plate having an integral bearing portion forming the support for said anchor pin substantially across the width of said brake element, said bearing portion having an opening through which the end of said brake element extends into engagement with said anchor pin.

6. In a brake construction, a pair of brake elements, an anchor pin between the ends of the pair of said brake elements, a pressed metal backing plate having an integral portion forming the support for said anchor pin, said bearing portion being formed with openings through which the ends of said brake elements extend into engagement with said anchor pin.

EDWIN R. EVANS.